United States Patent
Chen et al.

(10) Patent No.: US 7,053,581 B2
(45) Date of Patent: May 30, 2006

(54) ELECTRICALLY OPERATED DRIVE CONTROLLER, ELECTRICALLY OPERATED DRIVE CONTROL METHOD AND ITS PROGRAM

(75) Inventors: Zhiqian Chen, Aichi-ken (JP); Isao Fujiwara, Aichi-ken (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 0 days.

(21) Appl. No.: 11/148,223

(22) Filed: Jun. 9, 2005

(65) Prior Publication Data

US 2005/0285556 A1    Dec. 29, 2005

(30) Foreign Application Priority Data

Jun. 29, 2004 (JP) ............................. 2004-190738

(51) Int. Cl.
*G05B 1/36* (2006.01)
(52) U.S. Cl. ...................... 318/609; 318/610; 318/632; 318/432; 318/434
(58) Field of Classification Search ........ 318/432–434, 318/138, 254, 439, 727, 800, 609, 610, 632
See application file for complete search history.

(56) References Cited

U.S. PATENT DOCUMENTS

| | | | |
|---|---|---|---|
| 5,144,211 A | * | 9/1992 | Daggett et al. ........ 318/568.11 |
| 5,739,664 A | * | 4/1998 | Deng et al. .................. 318/808 |
| 6,166,514 A | * | 12/2000 | Ando et al. .................. 318/811 |
| 6,636,008 B1 | * | 10/2003 | Yamada et al. ............. 318/254 |
| 6,657,413 B1 | * | 12/2003 | Nakatsugawa et al. ..... 318/700 |
| 6,850,033 B1 | * | 2/2005 | Gallegos-Lopez et al. .. 318/807 |
| 6,924,617 B1 | * | 8/2005 | Schulz et al. ............... 318/701 |

FOREIGN PATENT DOCUMENTS

JP          05-130710 A          5/1993

* cited by examiner

*Primary Examiner*—Rina Duda
(74) *Attorney, Agent, or Firm*—Sughrue Mion, PLLC

(57) ABSTRACT

An electrically operated drive controller includes first and second electric current command value calculation processors, for calculating first and second electric current command values from a target value of torque of an electrically operated machine; a voltage command value calculation processor, for calculating a voltage command value from the first and second electric current command values; and first and second adjusting value calculation processor, for calculating first and second adjusting values. The first electric current command value calculation processor includes first electric current command value adjustment processors, for adjusting the first electric current command value by the first adjusting value, and an electric current limit processor, for limiting the adjusted first electric current command value. The second electric current command value calculation processor includes a second electric current command value adjustment processor, for adjusting the second electric current command value by the second adjusting value.

7 Claims, 6 Drawing Sheets

ELECTRICALLY OPERATED DRIVE CONTROLLER, ELECTRICALLY OPERATED DRIVE CONTROL METHOD AND ITS PROGRAM

This application claims priority to Japanese Patent Application JP 2004-190738, filed in the Japanese Patent Office on Jun. 29, 2004, the disclosure of which is incorporated herein by reference.

BACKGROUND OF THE INVENTION

1. Field of the Invention

The present invention relates to an electrically operated drive controller, an electrically operated drive control method and its program.

2. Background Art

A rotor, rotatably arranged and having a magnetic pole pair including a permanent magnet of the N-pole and the S-pole; a stator, arranged radially outward from this rotor and having stator coils of U-phase, V-phase and W-phase, etc., are arranged in a drive motor or an electric generator provided as an electrically operated machine.

An electrically operated drive unit is provided to drive the drive motor or the electric generator and to generate drive motor torque (torque of the drive motor), or electric generator torque (torque of the electric generator). A drive motor controller is provided as an electrically operated machine controller to drive the drive motor. An electric generator controller is provided as an electrically operated machine controller to operate the electric generator. Pulse width modulating signals of the U-phase, the V-phase and the W-phase generated in this electrically operated machine controller are sent to an inverter. A phase electric current generated in this inverter (i.e., the electric currents of the U-phase, the V-phase and the W-phase) is supplied to each of the stator coils. Thus, the drive motor torque is generated and the electric generator torque is generated.

For example, the drive motor controller performs feedback control using a vector control arithmetic operation on a d-q axis model in which a d-axis is set to the direction of the magnetic pole pair in the rotor, and a q-axis is set to the direction perpendicular to this d-axis. Thereby, the drive motor controller detects the electric current supplied to each stator coil, the magnetic pole position of the rotor, a direct current voltage of the inlet of the inverter, etc., and converts the detected electric current (i.e., the detection electric current) into a d-axis electric current and a q-axis electric current based on the magnetic pole position. Subsequently, the drive motor controller calculates a d-axis electric current command value and a q-axis electric current command value which are target values of the d-axis electric current and the q-axis electric current with reference to an electric current command value map. The drive motor controller further calculates a d-axis voltage command value and a q-axis voltage command value based on the deviation between the d-axis electric current and the d-axis electric current command value, the deviation between the q-axis electric current and the q-axis electric current command value, and parameters of the drive motor.

The d-axis electric current command value and the q-axis electric current command value are recorded to the electric current command value map correspondingly to drive motor target torque (a target value of the drive motor torque), the direct current voltage and an angular velocity. The parameters are calculated based on a back electromotive voltage constant MIf, a winding resistor Ra of each stator coil, inductances Ld, Lq, etc. (e.g., see JP-A-5-130710).

In the drive motor, back electromotive force is generated as the rotor is rotated. However, as the angular velocity is raised, a terminal voltage of the drive motor is also raised. When this terminal voltage exceeds a threshold value, voltage saturation is generated and the output of the drive motor is disabled.

Therefore, when the angular velocity is raised and enters a weak field control area, the electric current command value map is used to perform weak field control, and the d-axis electric current command value is increased in the negative direction in a predetermined area of high angular velocity in this electric current command value map. Thus, magnetic fluxes provided by a permanent magnet are canceled, and a linkage number of the magnetic flux to the stator coil is reduced. Accordingly, a driving area of the drive motor can be enlarged.

However, in the conventional drive motor controller, when the d-axis electric current command value becomes excessively large in the negative direction, weak field control can not be effectively performed, and drive motor torque can not be sufficiently generated.

SUMMARY OF THE INVENTION

An object of the present invention is to solve the problems of the conventional electrically operated drive controller and to provide an electrically operated drive controller, an electrically operated drive control method and its program able to effectively perform the weak field control and to sufficiently generate torque of the electrically operated machine.

An electrically operated drive controller of the present invention includes first and second electric current command value calculation processing means for calculating first and second electric current command values based on a target value of torque of an electrically operated machine; voltage command value calculation processing means for calculating a voltage command value based on the first and second electric current command values; and first and second adjusting value calculation processing means for calculating first and second adjusting values for adjusting the first and second electric current command values.

The first electric current command value calculation processing means includes first electric current command value adjustment processing means for adjusting the first electric current command value based on the first adjusting value, and electric current limit processing means for limiting the adjusted first electric current command value to a predetermined value. The second electric current command value calculation processing means includes second electric current command value adjustment processing means for adjusting the second electric current command value based on the second adjusting value as the first electric current command value is limited.

According to one exemplary aspect of the present invention, the electrically operated drive controller further comprises switching processing means for switching the first and second electric current command value adjustment processing means as the first electric current command value is limited.

According to another exemplary aspect of the present invention, the second electric current command value calculation processing means also calculates the second electric current command value based on the first electric current command value, calculated by the first electric current command value calculation processing means.

According to another exemplary aspect of the present invention, the second electric current command value calculation processing means also calculates the second electric current command value based on the target value of the torque of the electrically operated machine and on the first adjusting value.

According to another exemplary aspect of the present invention, the first and second adjusting value calculation processing means also calculate the first and second adjusting values based on a threshold value and on a voltage saturation judging index calculated based on the voltage command value and a voltage saturation judging index showing a degree of voltage saturation.

According to another exemplary embodiment of the present invention an electrically operated drive control method includes calculating first and second electric current command values based on a target value of torque of an electrically operated machine; calculating a voltage command value based on the first and second electric current command values; and calculating first and second adjusting values.

The first electric current command value is adjusted based on the first adjusting value and is limited to a predetermined value, and the second electric current command value is adjusted based on the second adjusting value as the first electric current command value is limited.

According to another exemplary embodiment of the present invention, a computer readable medium, having an electrically operated drive control program adapted to enable a computer to operate an electrically operated drive controller, enables the computer to perform the steps of: calculating first and second electric current command values based on a target value of torque of an electrically operated machine; a process for calculating a voltage command value based on the first and second electric current command values; and a process for calculating first and second adjusting values for adjusting the first and second electric current command values. The first electric current command value is adjusted on the basis of the first adjusting value and is limited to a predetermined value, and the second electric current command value is adjusted based on the second adjusting value as the first electric current command value is limited.

BRIEF DESCRIPTION OF THE DRAWINGS

These and other features, aspects, and advantages of the present invention will become better understood with reference to the following description and accompanying drawings, which should not be read to limit the invention in any way, in which.

DETAILED DESCRIPTION OF THE PREFERRED EMBODIMENTS

Exemplary embodiments of the present invention will next be explained in detail with reference to the drawings. An electrically operated drive unit mounted to an electric automobile as an electrically operated vehicle, and an electrically operated drive controller for operating this electrically operated drive unit will be explained.

Figure 1:
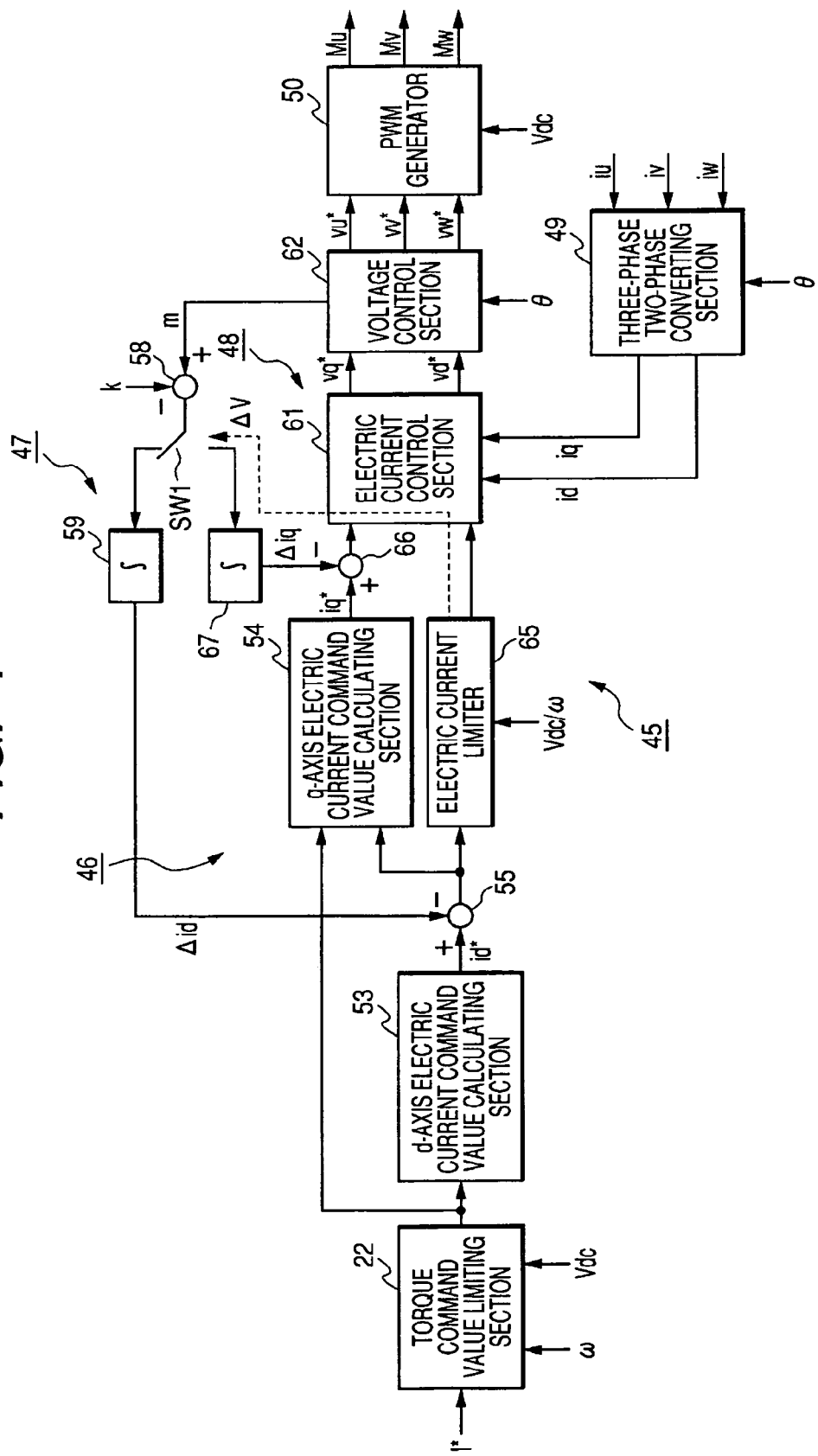
FIG. 1 is a block diagram of a drive motor controller of a first embodiment of the present invention.
Figure 2:
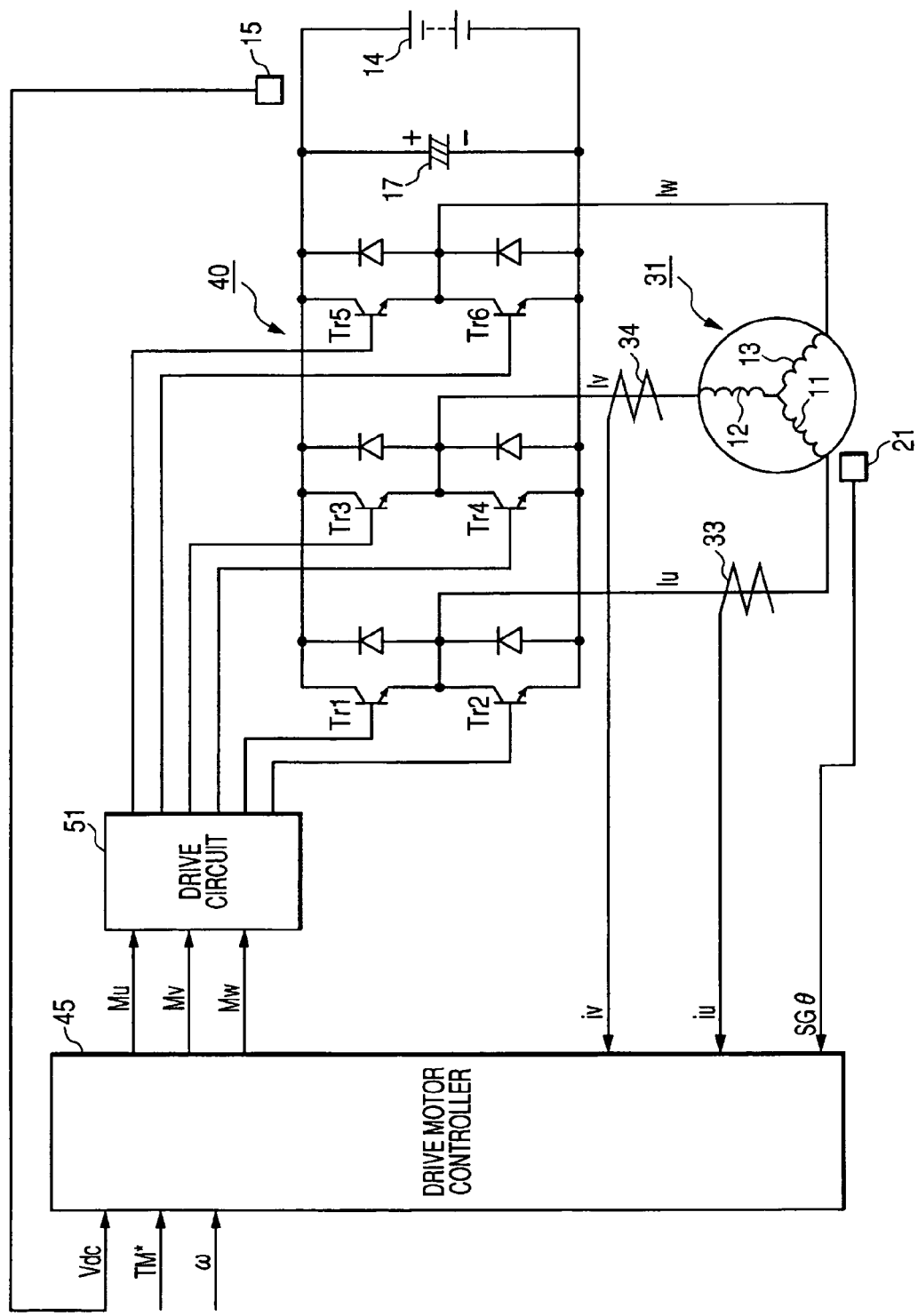
FIG. 2 is a conceptual view of an electrically operated drive unit of the first embodiment of the present invention.
Figure 3:
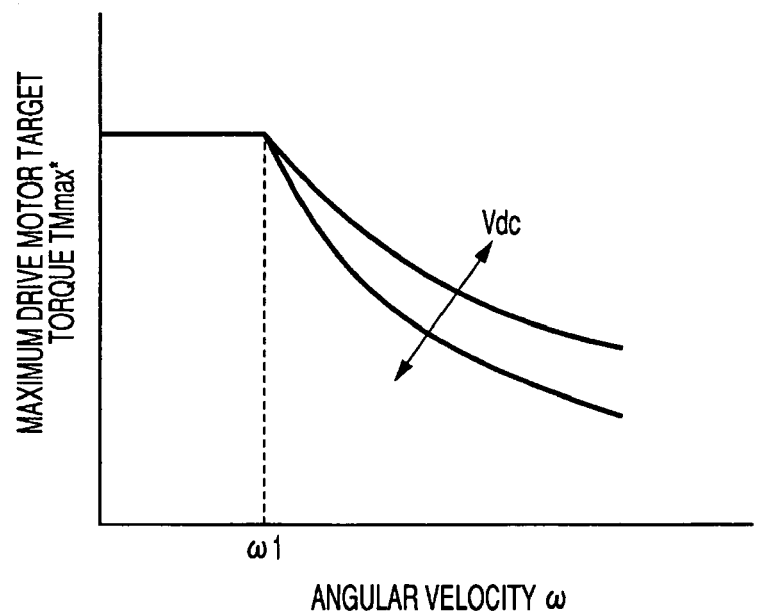
FIG. 3 is a maximum drive motor target torque map of the first embodiment of the present invention.
Figure 4:
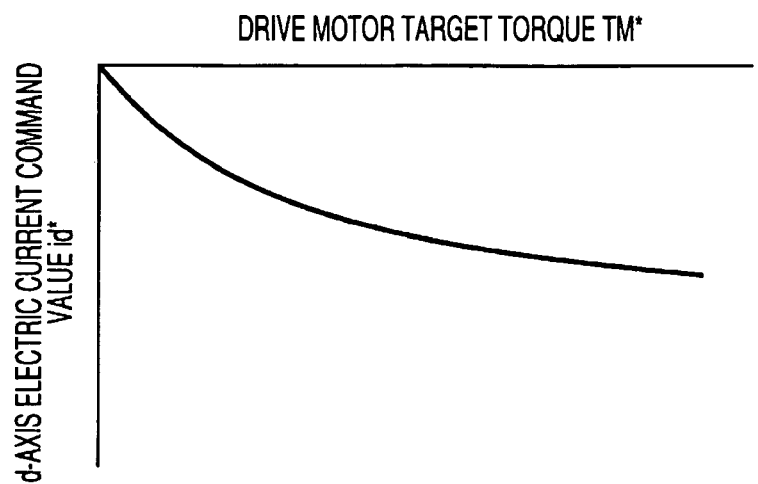
FIG. 4 is a first electric current command value map of the first embodiment of the present invention.
Figure 5:
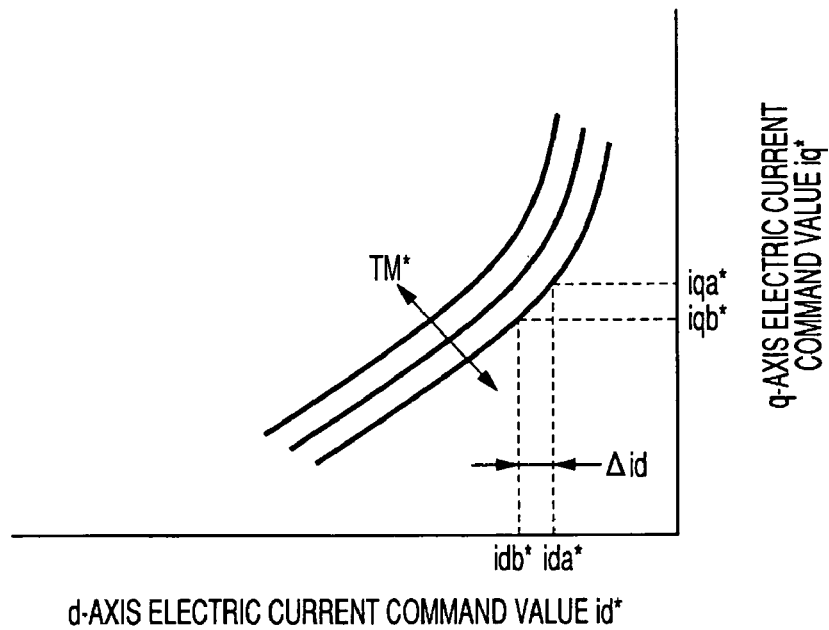
FIG. 5 is a second electric current command value map of the first embodiment of the present invention.
Figure 6:
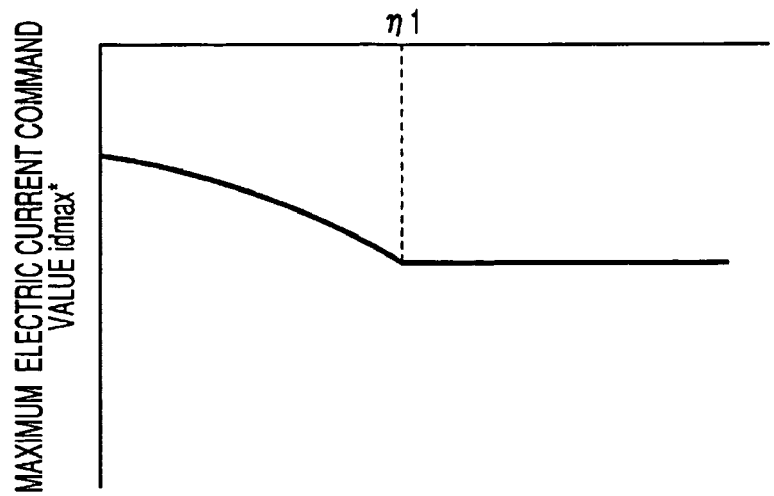
FIG. 6 is an electric current limit map of the first embodiment of the present invention.

FIG. 1 is a block diagram of a drive motor controller of a first embodiment of the present invention. FIG. 2 is a conceptual view of an electrically operated drive unit of the first embodiment of the present invention. FIG. 3 is a maximum drive motor target torque map of the first embodiment of the present invention. FIG. 4 is a first electric current command value map of the first embodiment of the present invention. FIG. 5 is a second electric current command value map of the first embodiment of the present invention. FIG. 6 is an electric current limit map of the first embodiment of the present invention. In FIG. 3, angular velocity $\omega$ is measured on the horizontal (x) axis and maximum drive motor target torque TMmax* is measured on the vertical (y) axis. In FIG. 4, drive motor target torque TM*, which is a target value of drive motor torque TM (torque of a drive motor 31 as an electrically operated machine), is measured on the horizontal (x) axis, and a d-axis electric current command value id* is measured on the vertical (y) axis. In FIG. 5, the d-axis electric current command value id* is measured on the horizontal (x) axis, and a q-axis electric current command value iq* is measured on the vertical (y) axis. In FIG. 6, an electric current limit parameter Vdc/co is measured on the horizontal (x) axis and a maximum electric current command value idmax* is measured on the vertical (y) axis.

In FIG. 2, reference numeral 31 designates the drive motor. For example, the drive motor 31 has an unillustrated rotor rotatably attached to a drive shaft of an electric automobile, etc., and a stator arranged radially outward from this rotor. The rotor has a rotor core, permanent magnets arranged at an equal pitch in a plurality of positions around the rotor core, and a magnetic pole pair includes the S-pole and the N-pole of the permanent magnet. The stator has a stator core in which teeth are formed so as to project radially inward in a plurality of positions around the stator core. The stator also has stator coils 11 to 13 (as coils of the U-phase, the V-phase and the W-phase) wound around the teeth.

In the output shaft of the rotor, a magnetic pole position sensor 21 is arranged as a magnetic pole position detecting section for detecting a magnetic pole position of the rotor. This magnetic pole position sensor 21 generates a magnetic pole position signal SGθ as a sensor output, and sends this magnetic pole position signal SGθ to a drive motor controller 45 (an electrically operated machine controller). A resolver can be arranged instead of the magnetic pole position sensor 21, as a magnetic pole position detecting section, and a magnetic pole position signal can be generated by this resolver.

A direct electric current from a battery 14 is converted into a phase electric current (i.e., electric currents Iu, Iv, Iw of the U-phase, the V-phase and the W-phase) by an inverter 40 (an electric current generator) to run the electric automobile by driving the drive motor 31. The electric currents Iu, Iv, Iw of the respective phases are respectively supplied to the stator coils 11 to 13.

The inverter 40 has transistors Tr1 to Tr6 as six switching elements, and sends a driving signal, generated in a drive circuit 51, to each of the transistors Tr1 to Tr6. The electric currents Iu, Iv, Iw of the respective phases can be generated by selectively turning each of the transistors Tr1 to Tr6 on and off. A power module such as an insulating gate bipolar transistor (IGBT), etc. formed by assembling two to six switching elements into one package, and an Intelligent Power Module (IPM) formed by assembling a drive circuit, etc. into IGBT can be used as the inverter 40.

A voltage sensor 15 (a voltage detecting section) is arranged on the inlet side in supplying the electric current from the battery 14 to the inverter 40. This voltage sensor 15 detects a direct current voltage Vdc of the inlet side of the inverter 40, and sends this direct current voltage Vdc to the drive motor controller 45. A battery voltage can be also used as the direct current voltage Vdc. In this case, a battery voltage sensor is arranged in the battery 14 as a voltage detecting section.

The electrically operated drive unit includes the drive motor 31, the inverter 40, the drive circuit 51, an unillustrated drive wheel, etc. Reference numeral 17 designates a capacitor.

The stator coils 11 to 13 are star-connected. Accordingly, when the values of electric currents of two phases among the respective phases are determined, the value of an electric current of the remaining one phase is also determined. Accordingly, for example, electric current sensors 33, 34 (forming an electric current detecting section for detecting the electric currents Iu, Iv of the U-phase and the V-phase) are arranged in lead wires of the stator coils 11, 12 of the U-phase and the V-phase to control the electric currents Iu, Iv, Iw of the respective phases. The electric current sensors 33, 34 send the detected electric currents to the drive motor controller 45 as detection electric currents iu, iv.

An unillustrated memory such as RAM, ROM, etc. for recording data and various kinds of programs is arranged in the drive motor controller 45 in addition to an unillustrated CPU functioning as a computer. First and second electric current command value maps are recorded in the memory. MPU can be used instead of CPU.

Various kinds of programs, data, etc. are recorded in the memory, but can also be recorded in another recording medium such as a hard disk, etc. arranged as an external memory device, etc. In this case, for example, a flash memory may be arranged in the drive motor controller 45, and the programs, data, etc. may be read from the recording medium and recorded to the flash memory. Accordingly, the programs, data, etc. can be updated by exchanging the external recording medium. As described above, according to one embodiment, a computer readable medium, having an electrically operated drive control program is adapted to enable a computer to operate the electrically operated drive controller 45.

The operation of the drive motor controller 45 will next be explained.

First, an unillustrated position detection processing means of the drive motor controller 45 performs position detection processing. It reads the magnetic pole position signal SGθ sent from the magnetic pole position sensor 21, and detects the magnetic pole position θ based on this magnetic pole position signal SGθ. Further, a rotating speed calculation processing means of the position detection processing means performs rotating speed calculation processing by calculating the angular velocity ω of the drive motor 31 from the magnetic pole position signal SGθ. The rotating speed calculation processing means also calculates a drive motor rotating speed NM (the rotating speed of the drive motor 31):

$$NM=60\times(2/p)\times\omega/2\pi$$

based on the angular velocity ω when the number of magnetic poles is set to p. An electrically operated machine rotating speed is calculated based on this drive motor rotating speed NM.

An unillustrated detection electric current acquisition processing means of the drive motor controller 45 performs detection electric current acquisition processing. It reads and obtains the detection electric currents iu, iv. The detection electric current acquisition processing means obtains a detection electric current iw:

$$iw=-iu-iv$$

by calculating this detection electric current iw based on the detection electric currents iu, iv.

Next, an unillustrated drive motor control processing means of the drive motor controller 45 performs drive motor control processing. It drives the drive motor 31 based on the drive motor target torque TM*, the detection electric currents iu, iv, iw, the magnetic pole position θ, the direct current voltage Vdc, etc. Electrically operated machine torque is calculated based on the drive motor torque TM, and electrically operated machine target torque is calculated based on the drive motor target torque TM*. In this embodiment, the drive motor controller 45 performs feedback control using a vector control arithmetic operation on a d-q axis model in which the d-axis is set to the direction of a magnetic pole pair in the rotor, and the q-axis is set to the direction perpendicular to this d-axis.

An unillustrated vehicle speed detection processing means of the drive motor controller 45 performs vehicle speed detection processing. It detects a vehicle speed V, corresponding to the drive motor rotating speed NM, based on the drive motor rotating speed NM, and sends the detected vehicle speed V to an unillustrated vehicle controller for controlling the entire operation of an electric automobile. A command value calculation processing means for a vehicle in the vehicle controller performs command value calculation processing for a vehicle. It reads the vehicle speed V and an accelerator aperture a and calculates vehicle request torque TO* based on the vehicle speed V and the accelerator aperture a. The command value calculation processing means for a vehicle further generates drive motor target torque TM* corresponding to this vehicle request torque TO*, and sends this drive motor target torque TM* to the drive motor controller 45.

In the drive motor controller 45, the drive motor control processing means has an electric current command value calculating section 46 (an electric current command value calculation-adjustment processing means), a weak field control processing section 47 (a weak field control processing means), a voltage command value calculation processing section 48 (a voltage command value calculation processing means), a three-phase/two-phase converting section 49 (a first phase conversion processing means), and a PWM generator 50 (an output signal generation processing means) to drive the drive motor 31 based on the drive motor target torque TM*.

The electric current command value calculating section 46 has a d-axis electric current command value calculating section 53, a subtracter 55 and an electric current limiter 65, together forming a first electric current command value calculation processing means, and also has a q-axis electric current command value calculating section 54 and a subtracter 66, together forming a second electric current command value calculation processing means to perform electric current command value calculation-adjustment processing. The d-axis electric current command value calculating section 53, the subtracter 55 and the electric current limiter 65 perform first electric current command value calculation processing. They calculate a d-axis electric current command value id* (a first electric current command value), which is a target value of a d-axis electric current id. The q-axis electric current command value calculating section 54 and the subtracter 66 perform second electric current command value calculation processing. They calculate a q-axis electric current command value iq* (a second electric current command value), which is a target value of a q-axis electric current iq. A maximum torque control processing means includes the d-axis electric current command value calculating section 53. First and second electric current command value adjustment processing means include the subtracters 55, 66. An electric current limit processing means includes the electric current limiter 65.

The weak field control processing section 47 has a switch SW1 (a switching processing means), a subtracter 58 (a voltage saturation calculating value calculation processing means), an integrator 59 (a first voltage saturation judgment processing means and a first adjusting value calculation processing means), and an integrator 67 (a second voltage saturation judgment processing means and a second adjusting value calculation processing means) to perform the weak field control processing. The weak field control processing section 47 performs the weak field control processing. It automatically performs weak field control when the battery voltage is lowered and the drive motor rotating speed NM is raised.

The voltage command value calculation processing section 48 has an electric current control section 61 (an electric current control processing means) and a voltage control section 62 (a voltage control processing means) to perform voltage command value calculation processing. The electric current control section 61 performs electric current control processing It calculates a d-axis voltage command value vd* and a q-axis voltage command value vq* (first and second axis voltage command values). The voltage control section 62 performs voltage control processing. It calculates voltage command values vu*, vv*, vw* (first to third phase voltage command values). The voltage command values include the d-axis voltage command value vd*, the q-axis voltage command value vq* and the voltage command values vu*, vv*, vw*.

The electric current command value calculating section 46 performs electric current command value calculation processing. It reads the drive motor target torque TM*, the angular velocity ω and the direct current voltage Vdc, and calculates the d-axis electric current command value id* and the q-axis electric current command value iq*.

When the drive motor target torque TM* is sent from the command value calculation processing means for a vehicle to the drive motor controller 45, a torque command value limiting section 22 (a torque command value limit processing means) of the drive motor controller 45 performs torque command value limit processing and reads the direct current voltage Vdc, the angular velocity w and the drive motor target torque TM*. With reference to the maximum drive motor target torque map of FIG. 3 recorded in the memory, the torque command value limiting section 22 also reads maximum drive motor target torque TMmax*, which is a maximum value of the drive motor target torque TM* corresponding to the direct current voltage Vdc and the angular velocity ω. The torque command value limiting section 22 also limits the drive motor target torque TM* so as not to exceed the maximum drive motor target torque TMmax*.

When the angular velocity ω is a predetermined value of ω1 or less in the drive motor target torque map of FIG. 3, the maximum drive motor target torque TMmax* has a constant value. In contrast to this, when the angular velocity ω1 exceeds the predetermined value ω1, the maximum drive motor target torque TMmax* decreases in a curve shape. In an area in which the angular velocity ω exceeds the predetermined value ω1, the maximum drive motor target torque TMmax* increases as the direct current voltage Vdc is raised, and decreases as the direct current voltage Vdc is lowered. A maximum electrically operated machine target torque map includes the maximum drive motor target torque map, and maximum electrically operated machine target torque includes the maximum drive motor target torque TMmax*.

Subsequently, the d-axis electric current command value calculating section 53 performs maximum torque control processing, and reads the drive motor target torque TM* limited in the torque command value limiting section 22. With reference to the first electric current command value map of FIG. 4 recorded in the memory, the d-axis electric current command value calculating section 53 reads the d-axis electric current command value id*, corresponding to the drive motor target torque TM*, and sends this d-axis electric current command value id* to the subtracter 55.

In this case, in the first electric current command value map of FIG. 4, the d-axis electric current command value id* is set such that the absolute value of the electric current amplitude command value is minimized to achieve the drive motor target torque TM*. In the first electric current command value map, the drive motor target torque TM* has a positive value, but the d-axis electric current command value id* has a negative value. When the drive motor target torque TM* is zero (0), the d-axis electric current command value id* is set to zero. As the drive motor target torque TM* is increased, the d-axis electric current command value id* is decreased (made more negative).

In the drive motor 31, back electromotive force is generated as the rotor is rotated. However, as the drive motor rotating speed NM is raised, the terminal voltage of the drive motor 31 is raised. When this terminal voltage exceeds a threshold value, voltage saturation is generated and an output of the drive motor 31 is disabled.

Therefore, an unillustrated voltage saturation judging index calculation processing means of the voltage control section 62 performs voltage saturation judging index calculation processing, and calculates a voltage saturation judging index m:

$$m = \sqrt{(vd^{*2}+vq^{*2})}/Vdc$$

which is a degree of the voltage saturation based on the d-axis voltage command value vd* and the q-axis voltage command value vq*, and sends the voltage saturation judging index m to the subtracter 58.

The subtracter 58 performs voltage saturation calculating value calculation processing, and subtracts a constant k (0.78 in this embodiment) from the voltage saturation judging index m when a threshold value showing a maximum output voltage of the inverter 40 is set to a comparison value Vmax:

$$Vmax = k \times Vdc.$$

The subtracter 58 also calculates a voltage saturation calculating value ΔV $$\Delta V = m - k,$$

and sends this voltage saturation calculating value ΔV to the weak field control processing section 47.

Accordingly, it is judged, in the weak field control processing section 47, whether it is necessary to perform the weak field control based on the voltage saturation calculating value ΔV. When it is necessary to perform the weak field control, the d-axis electric current command value id* is decreased (made more negative).

Therefore, the integrator 59 performs first voltage saturation judgment processing and first adjusting value calculation processing. It integrates the voltage saturation calculating value ΔV every control timing, and calculates an integrating value ΣΔV when the integrator 59 receives the voltage saturation calculating value ΔV from the subtracter 58 through the switch SW1. When this integrating value ΣΔV has a positive value, the integrator 59 multiplies the integrating value ΣΔV by a proportional constant and calculates a first adjusting value Δid for performing the weak field control. It sets this first adjusting value Δid to a positive value. When the voltage saturation calculating value ΔV or the integrating value ΣΔV has a value of zero or less, the integrator 59 sets the first adjusting value Δid to zero.

The subtracter 55 performs first electric current command value adjustment processing. It receives the first adjusting value Δid and adjusts the d-axis electric current command value id* by subtracting the first adjusting value Δid from the d-axis electric current command value id*. The subtracter 55 then sends the adjusted d-axis electric current command value id* to the q-axis electric current command value calculating section 54 and the electric current control section 61.

In this case, when the first adjusting value Δid has a value of zero, the d-axis electric current command value id* is not adjusted and the weak field control is not performed. In contrast to this, when the first adjusting value Δid has a positive value, the d-axis electric current command value id* is adjusted and is decreased (made more negative) and the weak field control is performed.

Thus, when the d-axis electric current command value id* is calculated, the q-axis electric current command value calculating section 54 reads the drive motor target torque TM*, limited in the torque command value limiting section 22, and the d-axis electric current command value id*. With reference to the second electric current command value map of FIG. 5 recorded in the memory, the q-axis electric current command value calculating section 54 calculates the q-axis electric current command value iq* corresponding to the drive motor target torque TM* and the d-axis electric current command value id*.

In the second electric current command value map of FIG. 5, the d-axis electric current command value id* is decreased (made more negative) and the q-axis electric current command value iq* is increased as the drive motor target torque TM* is increased. As the drive motor target torque TM* is reduced, the d-axis electric current command value id* is increased (made less negative) and the q-axis electric current command value iq* is decreased. Further, when the drive motor target torque TM* is constant and the d-axis electric current command value id* is decreased (made more negative), the q-axis electric current command value iq* decreases.

Accordingly, when the first adjusting value Δid is zero and the weak field control is not performed and the value of the d-axis electric current command value id* sent to the subtracter 55 is ida*, as shown in e.g., FIG. 5, the d-axis electric current command value id* is sent to the q-axis electric current command value calculating section 54 as the value ida* without adjusting, since the first adjusting value Δid is zero. In the q-axis electric current command value calculating section 54, the value of the q-axis electric current command value iq* becomes iqa*. In contrast to this, when the first adjusting value Δid has a positive value and the weak field control is performed, e.g., when the value of the d-axis electric current command value id* sent to the subtracter 55 is ida*, the d-axis electric current command value id* is set to a value idb*, which is less (more negative) than ida* by a value Δid, in the subtracter 55 and is sent to the q-axis electric current command value calculating section 54. In the q-axis electric current command value calculating section 54, the q-axis electric current command value iq* is decreased from the value iqa* and becomes a value iqb*.

Thus, when the voltage saturation is generated, the d-axis electric current command value id* is decreased (made more negative) by the amount of the first adjusting value Δid and the drive motor 31 can be driven in a weak field control area. The driving area of the drive motor 31 can be enlarged.

When the d-axis electric current command value id* is excessively decreased (made more negative), the effect of the weak field control can not be sufficiently utilized.

Therefore, the electric current limiter 65 is arranged between the subtracter 55 and the electric current control section 61, and a maximum electric current command value idmax* is set as a limit value of the d-axis electric current command value id*. When the d-axis electric current command value id*, adjusted in the subtracter 55, exceeds the maximum electric current command value idmax*, and is increased, the d-axis electric current command value id*, output from the subtracter 55, is limited in the electric current limiter 65 such that the d-axis electric current command value id* sent to the electric current control section 61 becomes the maximum electric current command value idmax*.

An electric current limit map as shown in FIG. 6 is recorded in the memory. The electric current limiter 65 performs electric current limit processing and reads an electric current limit parameter Vdc/ω corresponding to the direct current voltage Vdc and the angular velocity ω calculated by the drive motor control processing means. With reference to the electric current limit map of FIG. 6, the electric current limiter 65 reads the maximum electric current command value idmax*, which is a maximum value of the d-axis electric current command value id*, corresponding to the electric current limit parameter Vdc/co and limits the d-axis electric current command value id* so as not to exceed the maximum electric current command value idmax*.

When the electric current limit parameter Vdc/ω is a predetermined value η1 or less in the electric current limit map, the maximum electric current command value idmax* is decreased (made more negative) in a curve shape as the electric current limit parameter Vdc/ω is increased. In contrast to this, when the electric current limit parameter Vdc/ω becomes greater than the value η1, the maximum electric current command value idmax* is constant.

Thus, when the d-axis electric current command value id*, adjusted in the subtracter 55, exceeds the maximum electric current command value idmax* and is increased, the d-axis electric current command value id* is limited in the electric current limiter 65, and is set to the maximum electric current command value idmax*. Accordingly, the weak field control can be effectively performed and the drive motor torque TM can be sufficiently generated.

In this case, the d-axis electric current command value id*, adjusted in the subtracter 55, is sent to the q-axis electric current command value calculating section 54 without adjusting. Accordingly, it attains a state in which only the d-axis electric current command value id* is limited. Therefore, an unillustrated electric current limit judgment processing means of the electric current limiter 65 performs electric current limit judgment processing. It judges whether the d-axis electric current command value id* is limited by judging whether the d-axis electric current command value id*, adjusted in the subtracter 55, is greater than the maximum electric current command value idmax*. When the d-axis electric current command value id*, adjusted in the subtracter 55, is greater than the maximum electric current command value idmax*, the electric current limit judgment processing means judges that the electric current is limited, and sends an electric current limit judging signal to the switch SW1.

This switch SW1 performs switching processing. When the switch SW1 receives the electric current limit judging signal, the switch SW1 is switched while holding the first adjusting value Δid at this receiving time point. The subtracter 58 and the integrator 59 are interrupted and the subtracter 58 and the integrator 67 are connected. Thus, the subtracter 55 adjusts the d-axis electric current command value id* in accordance with the first adjusting value Δid at the switching time point of the switch SW1, and sends the d-axis electric current command value id* to the q-axis electric current command value calculating section 54 and the electric current limiter 65.

The integrator 67 performs second voltage saturation judgment processing and second adjusting value calculation processing. When the integrator 67 receives the voltage saturation calculating value ΔV from the subtracter 58 through the switch SW1, the integrator 67 integrates this voltage saturation calculating value ΔV every control timing, and calculates an integrating value ΣΔV. When the integrating value ΣΔV has a positive value, the integrator 67 multiplies the integrating value ΣΔV by a proportional constant, calculates the second adjusting value Δiq, and sets this second adjusting value Δiq to a positive value. When the voltage saturation calculating value ΔV or the integrating value ΣΔV has a value of zero or less, the integrator 67 sets the second adjusting value Δiq to zero.

The subtracter 66 performs second electric current command value adjustment processing. It receives the second adjusting value Δiq and adjusts the q-axis electric current command value iq* by subtracting the second adjusting value Δiq from the q-axis electric current command value iq*.

In this case, when the second adjusting value Δiq has a value of zero, the q-axis electric current command value iq* is not adjusted. In contrast to this, when the second adjusting value Δiq has a positive value, the q-axis electric current command value iq* is adjusted and is decreased.

The three-phase/two-phase converting section 49 performs three-phase/two-phase conversion as first phase conversion processing, and reads the magnetic pole position θ. The three-phase/two-phase converting section 49 converts detection electric currents iu, iv, iw into a d-axis electric current id and a q-axis electric current iq. It calculates the d-axis electric current id and the q-axis electric current iq as the actual electric currents, and sends the d-axis electric current id and the q-axis electric current iq to the electric current control section 61. This electric current control section 61 receives the d-axis electric current command value id* after the electric current limit processing from the electric current limiter 65, and also receives the q-axis electric current command value iq* after the weak field control processing from the subtracter 66. When the electric current control section 61 receives the d-axis electric current id and the q-axis electric current iq from the three-phase/two-phase converting section 49, the electric current control section 61 performs feedback control.

Therefore, the electric current control section 61 calculates the electric current deviation δid between the d-axis electric current command value id* and the d-axis electric current id, and the electric current deviation δiq between the q-axis electric current command value iq* and the q-axis electric current iq. The electric current control section 61 then performs proportional control and integral control based on each of the electric current deviations δid, δiq.

Namely, the electric current control section 61 calculates a voltage drop Vzdp, which is a voltage command value of a proportional component based on the electric current deviation δid, and calculates a voltage drop Vzdi, which is a voltage command value of an integral component. The electric current control section 61 also adds the voltage drops Vzdp, Vzdi and calculates a voltage drop Vzd:

$$Vzd = Vzdp + Vzdi.$$

Further, the electric current control section 61 reads the angular velocity ω and the q-axis electric current iq, and calculates an induced voltage ed:

$$ed = \omega \times Lq \times iq$$

induced by the q-axis electric current iq based on the angular velocity ω, the q-axis electric current iq and q-axis inductance Lq. The electric current control section 61 also subtracts the induced voltage ed from the voltage drop Vzd and calculates a d-axis voltage command value vd* as an output voltage:

$$vd^* = Vzd - ed$$
$$= Vzd - \omega \times Lq \times iq.$$

The electric current control section 61 also calculates a voltage drop Vzqp, which is a voltage command value of the proportional component based on the electric current deviation ωiq, and a voltage drop Vzqi, which is a voltage command value of the integral term component. The electric current control section 61 also adds the voltage drops Vzqp, Vzqi and calculates a voltage drop Vzq:

$$Vzq = Vzqp + Vzqi.$$

Further, the electric current control section 61 reads the angular velocity ω and the d-axis electric current id, and calculates an induced voltage eq:

$$eq = \omega(MIf + Ld \times id)$$

induced by the d-axis electric current id based on the angular velocity ω, a back electromotive voltage constant MIf, the d-axis electric current id and inductance Ld on the d-axis. The electric current control section 61 also adds the induced voltage eq to the voltage drop Vzq and calculates a q-axis voltage command value vq* as an output voltage:

$$vq^* = Vzq + eq$$
$$= Vzq + \omega(MIf + Ld \times id).$$

Subsequently, a two-phase/three-phase converting section (an unillustrated second phase conversion processing means of the voltage control section 62) performs second phase conversion processing, and reads the d-axis voltage command value vd*, the q-axis voltage command value vq* and the magnetic pole position θ. The two-phase/three-phase converting section also converts the d-axis voltage command value vd* and the q-axis voltage command value vq* into voltage command values vu*, vv*, vw*, and sends these voltage command values vu*, vv*, vw* to the PWM generator 50.

The PWM generator 50 performs output signal generation processing. It generates pulse width modulating signals Mu, Mv, Mw of the respective phases having pulse widths corresponding to the d-axis electric current command value id* and the q-axis electric current command value iq* as output signals based on the voltage command values vu*, vv*, vw* of the respective phases and the direct current voltage Vdc. The PWM generator 50 then sends these pulse width modulating signals Mu, Mv, Mw to the drive circuit 51.

The drive circuit 51 receives the pulse width modulating signals Mu, Mv, Mw of the respective phases, generates six driving signals, and sends these six driving signals to the inverter 40. The inverter 40 generates electric currents Iu, Iv, Iw of the respective phases by switching transistors Tr1 to Tr6 based on the pulse width modulating signals Mu, Mv, Mw, and supplies the electric currents Iu, Iv, Iw of the respective phases to the respective stator coils 11 to 13 of the drive motor 31.

Thus, the torque control is performed based on the drive motor target torque TM*, and the electric automobile runs by driving the drive motor 31.

As the switch SW1 is switched, the d-axis electric current command value id* is fixed to a value limited by the electric current limiter 65. In contrast to this, the q-axis electric current command value iq* is decreased as long as the second adjusting value Δiq has a positive value. In this case, the d-axis electric current command value id* and the q-axis electric current command value iq* cannot be generated on a curve of the same drive motor target torque TM* in the second electric current command value map of FIG. 5, and the drive motor torque TM actually generated is reduced. However, when the voltage saturation judging index m is increased, the q-axis electric current command value iq* is decreased. Accordingly, it is possible to prevent that the voltage saturation is generated and output of the drive motor 31 is disabled.

Next, a second embodiment of the present invention will be explained. Elements having the same structures as the first embodiment are designated by the same reference numerals, and their explanations are omitted. With respect to effects of the invention provided by arranging the same structures, the effects of the first embodiment are quoted.

Figure 7:
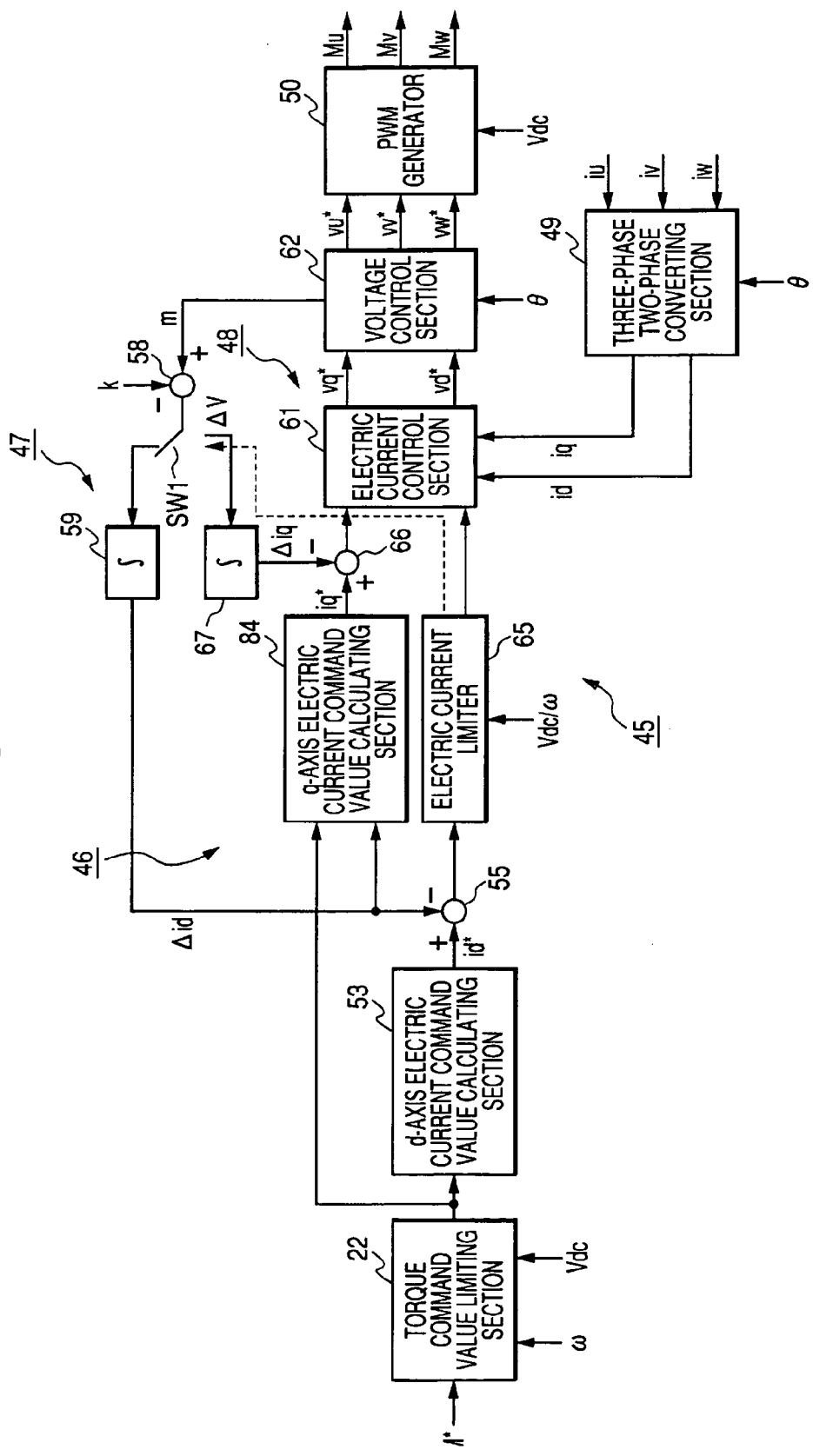
FIG. 7 is a block diagram of a drive motor controller of a second embodiment of the present invention.
Figure 8:
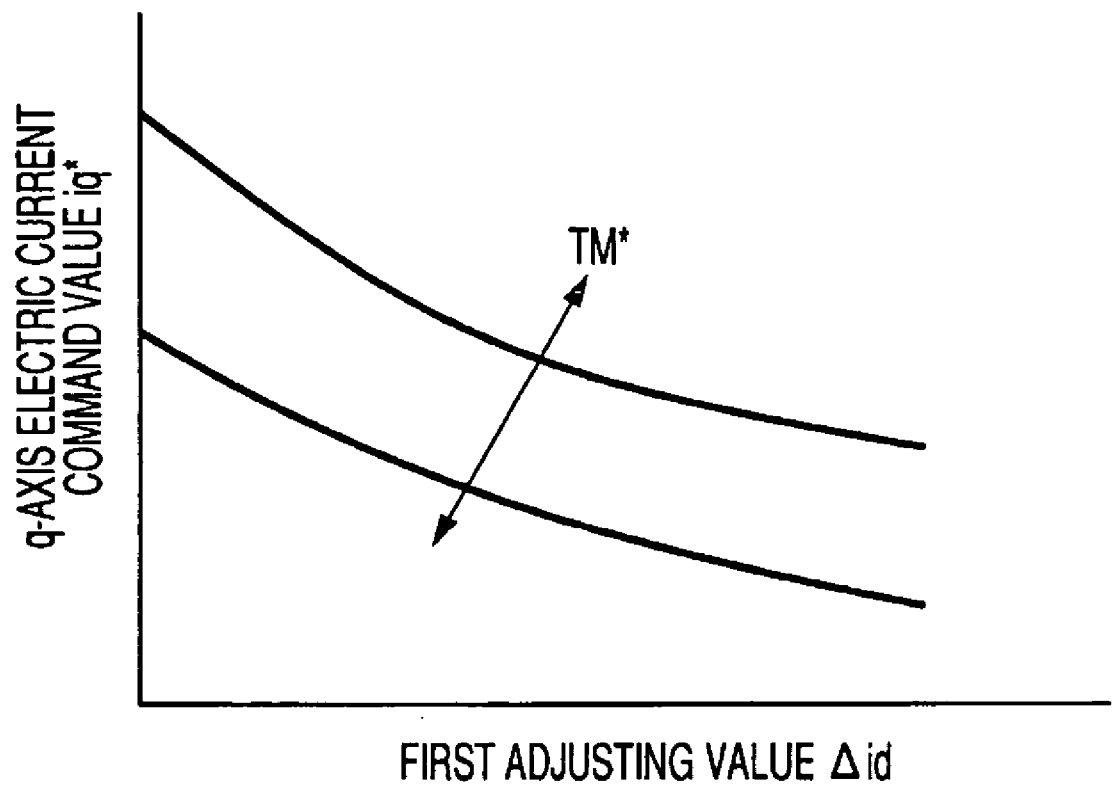
FIG. 8 is a second electric current command value map of the second embodiment of the present invention.

FIG. 7 is a block diagram of a drive motor controller of the second embodiment of the present invention. FIG. 8 is a second electric current command value map of second embodiment of the present invention. In FIG. 8, the first adjusting value Δid is measured on the horizontal (x) axis, and the q-axis electric current command value iq* is measured on the vertical (y) axis.

In this case, the electric current command value calculating section 46 (an electric current command value calculation-adjustment processing means) has a d-axis electric current command value calculating section 53, a subtracter 55 and an electric current limiter 65 (a first electric current command value calculation processing means), and also has a q-axis electric current command value calculating section 84 and a subtracter 66 (a second electric current command value calculation processing means) to perform electric current command value calculation-adjustment processing. The d-axis electric current command value calculating section 53, the subtracter 55 and the electric current limiter 65 perform first electric current command value calculation processing. they calculate the d-axis electric current command value id* (a first electric current command value). The q-axis electric current command value calculating section 84 and the subtracter 66 perform second electric current command value calculation processing. They calculate the q-axis electric current command value iq* (a second electric current command value). A maximum torque control processing means includes the d-axis electric current command value calculating section 53. First and second electric current command value adjustment processing means include the subtracters 55, 66. An electric current limit processing means includes the electric current limiter 65.

The weak field control processing section 47 (a weak field control processing means) has a switch SW1 (a switching processing means), a subtracter 58 (a voltage saturation calculating value calculation processing means), an integrator 59) a first voltage saturation judgment processing means and a first adjusting value calculation processing means), and an integrator 67 (a second voltage saturation judgment processing means and a second adjusting value calculation processing means) to perform the weak field control. When the angular velocity co and the drive motor rotating speed NM are raised, the weak field control processing section 47 automatically performs the weak field control.

The d-axis electric current command value calculating section 53 performs maximum torque control processing. With reference to a first electric current command value map similar to that of FIG. 4 recorded in the memory, the d-axis electric current command value calculating section 53 reads the d-axis electric current command value id*, corresponding to the drive motor target torque TM*, and sends this d-axis electric current command value id* to the subtracter 55.

Further, the voltage saturation judging index calculation processing means of the voltage control section 62 (the voltage control processing means) performs voltage saturation judging index calculation processing. It calculates the voltage saturation judging index m similarly to the first embodiment based on the d-axis voltage command value vd* and the q-axis voltage command value vq*, and sends this voltage saturation judging index m to the subtracter 58 (a voltage saturation calculating value calculation processing means).

This subtracter 58 performs voltage saturation calculating value calculation processing. It calculates a voltage saturation calculating value ΔV by subtracting a constant k from the voltage saturation judging index m, and sends this voltage saturation calculating value ΔV to the weak field control processing section 47.

Accordingly, it is judged in the weak field control processing section 47 whether it is necessary to perform the weak field control based on the voltage saturation calculating value ΔV. When it is necessary to perform the weak field control, the d-axis electric current command value id* is decreased (made more negative).

Therefore, the integrator 59 performs first voltage saturation judgment processing and first adjusting value calculation processing. When the integrator 59 receives the voltage saturation calculating value ΔV from the subtracter 58 through the switch SW1, the integrator 59 integrates this voltage saturation calculating value ΔV every control timing, and calculates an integrating value ΣΔV. When this integrating value ΣΔV has a positive value, the integrator 59 multiplies the integrating value ΣΔV by a proportional constant, and calculates a first adjusting value Δid for performing the weak field control, and sets the first adjusting value Δid to a positive value. When the voltage saturation calculating value ΔV or the integrating value ΣΔV has a value of zero or less, the integrator 59 sets the first adjusting value Δid to zero.

The subtracter 55 then performs first electric current command value adjustment processing. It receives the first adjusting value Δid, and adjusts the d-axis electric current command value id* by subtracting the first adjusting value Δid from the d-axis electric current command value id*.

In this case, when the first adjusting value Δid has a value of zero, the d-axis electric current command value id* is not adjusted and the weak field control is not performed. In contrast to this, when the first adjusting value Δid has a positive value, the d-axis electric current command value id* is adjusted and is decreased (made more negative) and the weak field control is performed.

On the other hand, the q-axis electric current command value calculating section 84 reads the drive motor target torque TM* and the first adjusting value Δid, limited in the torque command value limiting section 22. With reference to the second electric current command value map of FIG. 8 recorded in the memory, the q-axis electric current command value calculating section 84 reads the q-axis electric current command value iq*, corresponding to the drive motor target torque TM*, and the first adjusting value Δid, and sends this q-axis electric current command value iq* to the subtracter 66. In the second electric current command value map of FIG. 8, the q-axis electric current command value iq* is increased as the first adjusting value Δid is reduced and the drive motor target torque TM* is increased. The q-axis electric current command value iq* is decreased as the adjusting value Δid is increased and the drive motor target torque TM* is reduced.

Similar to the first embodiment, the electric current limiter 65 is arranged between the subtracter 55 and the electric current control section 61. A maximum electric current command value idmax* is set as a limit value of the d-axis electric current command value id*. When the d-axis electric current command value id*, adjusted in the subtracter 55, exceeds the maximum electric current command value idmax* and is increased, the d-axis electric current command value id*, output from the subtracter 55, is limited in the electric current limiter 65 such that the d-axis electric current command value id*, sent to the electric current control section 61, becomes the maximum electric current command value idmax*.

The electric current limit judgment processing means of the electric current limiter 65 performs electric current limit judgment processing. It judges whether the d-axis electric current command value id* is limited by judging whether the d-axis electric current command value id*, adjusted in the subtracter 55, is greater than the maximum electric current command value idmax*. When the d-axis electric current command value id*, adjusted in the subtracter 55, is greater than the maximum electric current command value idmax*, the electric current limit judgment processing means judges that the electric current is limited, and sends an electric current limit judging signal to the switch SW1.

This switch SW1 performs switching processing. When the switch SW1 receives the electric current limit judging signal, the switch SW1 is switched while holding the first adjusting value Δid at this receiving time point. The subtracter 58 and the integrator 59 are interrupted, and the subtracter 58 and the integrator 67 are connected. Thus, the subtracter 55 adjusts the d-axis electric current command value id* in accordance with the first adjusting value Δid at the switching time point of the switch SW1, and sends this d-axis electric current command value id* to the electric current limiter 65.

The integrator 67 then performs second voltage saturation judgment processing and second adjusting value calculation processing. When the integrator 67 receives the voltage saturation calculating value ΔV from the subtracter 58 through the switch SW1, the integrator 67 integrates this voltage saturation calculating value ΔV every control timing, and calculates an integrating value ΣΔV. When this integrating value ΣΔV has a positive value, the integrator 67 multiplies the integrating value ΣΔV by a proportional constant, calculates a second adjusting value Δiq, and sets this second adjusting value Δiq to a positive value. When the voltage saturation calculating value ΔV or the integrating value ΣΔV has a value of zero or less, the integrator 67 sets the second adjusting value Δiq to zero.

The subtracter 66 performs second electric current command value adjustment processing. It receives the second adjusting value Δiq, and adjusts the q-axis electric current command value iq* by subtracting the second adjusting value Δiq from the q-axis electric current command value iq*.

In this case, when the second adjusting value Δiq has a value of zero, the q-axis electric current command value iq* is not adjusted. In contrast to this, when the second adjusting value Δiq has a positive value, the q-axis electric current command value iq* is adjusted and is decreased.

In each of the exemplary embodiments of the present invention, the d-axis command value id* is calculated (a first electric current command value) in the d-axis command value calculating section 53 (a first electric current command value calculation processing means). The q-axis command value iq* is calculated as a second electric current command value in the q-axis command value calculating sections 54, 84 (a second electric current command value calculation processing means). However, instead of the d-axis command value calculating section 53 and the q-axis command value calculating sections 54, 84, an electric current amplitude command value calculating section can be arranged as the first electric current command value calculation processing means, and an electric current phase command value calculating section can be arranged as the second electric current command value calculation processing means. The d-axis command value id* and the q-axis command value iq* can be calculated after an electric current amplitude command value is calculated (the first electric current command value) and an electric current phase command value is calculated (the second electric current command value).

Further, an electric current phase command value calculating section can be arranged as the first electric current command value calculation processing means, and an electric current amplitude command value calculating section can be arranged as the second electric current command value calculation processing means. The d-axis electric current command value id* and the q-axis electric current command value iq* can be calculated after an electric current phase command value is calculated as the first electric current command value and an electric current amplitude command value is calculated as the second electric current command value.

In each of the exemplary embodiments of the present invention, the driving case of the drive motor 31 is explained, but the present invention can be applied to a case in which the electric generator is operated.

Although exemplary embodiments of the present invention have been described, it will be understood by one of skill in the art that the present invention is not limited to the described embodiments, but can be variously modified within the spirit and scope of the invention.

What is claimed is:

1. An electrically operated drive controller, comprising:
   first and second electric current command value calculation processing means for calculating first and second electric current command values based on a target value of torque of an electrically operated machine;
   voltage command value calculation processing means for calculating a voltage command value based on said first and second electric current command values; and
   first and second adjusting value calculation processing means for calculating first and second adjusting values;
   wherein
      said first electric current command value calculation processing means comprises
         first electric current command value adjustment processing means for adjusting the first electric current command value based on said first adjusting value, and
         electric current limit processing means for limiting the adjusted first electric current command value to a predetermined value; and
      said second electric current command value calculation processing means comprises second electric current command value adjustment processing means for adjusting the second electric current command value based on said second adjusting value as the first electric current command value is limited.

2. The electrically operated drive controller according to claim 1, wherein the electrically operated drive controller further comprises:
   switching processing means for switching said first and second electric current command value adjustment processing means as said first electric current command value is limited.

3. The electrically operated drive controller according to claim 1, wherein said second electric current command value calculation processing means calculates the second electric current command value based on the first electric current command value calculated by said first electric current command value calculation processing means.

4. The electrically operated drive controller according to claim 1, wherein said second electric current command value calculation processing means calculates the second electric current command value based on said target value of the torque of the electrically operated machine and the first adjusting value.

5. The electrically operated drive controller according to claim 1, wherein said first and second adjusting value calculation processing means calculate said first and second adjusting values based on a threshold value and a voltage saturation judging index calculated based on said voltage command value and a voltage saturation judging index showing a degree of voltage saturation.

6. An electrically operated drive control method, comprising:
   calculating first and second electric current command values based on electrically operated machine target torque showing a target value of torque of an electrically operated machine;
   calculating a voltage command value based on the first and second electric current command values; and
   calculating first and second adjusting values;
   wherein,
      said first electric current command value is adjusted based on said first adjusting value and is limited to a predetermined value, and
      said second electric current command value is adjusted based on said second adjusting value as the first electric current command value is limited.

7. A computer readable medium having an electrically operated drive control program adapted to enable a computer to operate an electrically operated drive controller, the program enabling the computer to perform the steps of:
   calculating first and second electric current command values based on electrically operated machine target torque showing a target value of torque of an electrically operated machine;
   calculating a voltage command value based on the first and second electric current command values; and
   calculating first and second adjusting values;
   wherein,
      said first electric current command value is adjusted based on said first adjusting value and is limited to a predetermined value, and
      said second electric current command value is adjusted based on said second adjusting value as the first electric current command value is limited.

* * * * *